(12) United States Patent
Chou

(10) Patent No.: US 7,137,758 B2
(45) Date of Patent: Nov. 21, 2006

(54) CONSTRUCTION BUILT FROM WASTE TIRES AND ITS CONSTRUCTING METHOD

(76) Inventor: Ming-Hui Chou, No. 515, Nanshang Rd., Gueishan Hsiang Taoyuan Hsien (TW)

( * ) Notice: Subject to any disclaimer, the term of this patent is extended or adjusted under 35 U.S.C. 154(b) by 0 days.

(21) Appl. No.: 11/030,765

(22) Filed: Jan. 7, 2005

(65) Prior Publication Data

US 2006/0153638 A1 Jul. 13, 2006

(51) Int. Cl.
*E02D 29/02* (2006.01)
(52) U.S. Cl. ............ 405/284; 405/15; 405/16; 405/17; 405/30; 405/302.4; 405/302.6; 52/DIG. 9
(58) Field of Classification Search ............ 405/15–17, 405/30, 284, 286, 262, 287, 302.4, 302.6; 52/DIG. 9; 428/44; 404/6–8
See application file for complete search history.

(56) References Cited

U.S. PATENT DOCUMENTS

| | | | | |
|---|---|---|---|---|
| 4,080,793 A | * | 3/1978 | Pulsifer | ............ 52/DIG. 9 |
| 4,188,153 A | * | 2/1980 | Taylor | ............ 52/DIG. 9 |
| 4,785,577 A | * | 11/1988 | Lederbauer | ............ 405/284 |
| 5,480,255 A | * | 1/1996 | Bernaquez et al. | ............ 404/6 |
| 6,213,687 B1 | * | 4/2001 | Broughton et al. | ....... 405/302.6 |
| 6,316,069 B1 | * | 11/2001 | Bove et al. | ............ 428/44 |
| 6,457,912 B1 | * | 10/2002 | Leibl | ............ 405/302.4 |
| 6,505,993 B1 | * | 1/2003 | Diem | ............ 404/6 |
| 6,592,761 B1 | * | 7/2003 | Wofford | ............ 52/741.12 |
| 6,705,803 B1 | * | 3/2004 | Callinan et al. | ............ 405/30 |
| 6,896,449 B1 | * | 5/2005 | Callinan et al. | ............ 405/284 |

FOREIGN PATENT DOCUMENTS

JP 59000427 * 1/1984 ............ 405/286

* cited by examiner

*Primary Examiner*—Frederick L. Lagman
(74) *Attorney, Agent, or Firm*—Alan D. Kamrath; Nikolai & Mersereau, P.A.

(57) ABSTRACT

A constructing method by using waste tires includes cutting sidewalls from waste tires; connecting multiple waste tires in series together by the sidewalls to form a layer of waste tires; filling the waste tires with ballast; and stacking another layer of waste tires on the previous layer with a staggered arrangement. An end member, being composed of a cut waste tire with two ends connected to an outer periphery of an unbroken waste tire, is provided at an end portion of the layers. Whereby, the construction built from waste tires can be used in projects such as a protection slope, road berm, riverbank, riverbed, etc., and has a good strength and a low cost.

13 Claims, 8 Drawing Sheets

CONSTRUCTION BUILT FROM WASTE TIRES AND ITS CONSTRUCTING METHOD

BACKGROUND OF THE INVENTION

1. Field of the Invention

The present invention relates to a construction built from waste tires and its constructing method and, more particularly, to construction used in projects such as in a protection slope, road berm, riverbank, or riverbed.

2. Description of Related Art

All types of tires have a finite work-life and need to be replaced at some time. However, the disposal of the used tires is a big problem, because they are made of rubber which will cause serious air pollution if burned. Hence, it is important to effectively recycle the waste tires to avoid polluting the air.

A second problem to the environment is the erosion of hillsides, slopes, etc., due to deforestation, and a single solution to the waste tire and erosion problems would be very convenient. Hence, it has been proposed to recycle the tires on the hillsides, etc., in the following manners:

1. Multiple waste tires are connected in series on slopes of the roads and fixed by rods arranged in longitudinal directions. However, this construction collapses easily due to a weak sustaining power of the rods.

2. A second utilization of the waste tires is on bulwarks. The waste tires are filled with concrete and placed on the bulwarks. However, the price of the concrete tires high, thereby making the cost of the second utilization uneconomical.

3. Another conventional structure to protect slopes includes baskets each filled with stones and placed on the slopes. However, for preventing the stones from escaping from meshes of the baskets, the stones with sizes smaller than that of the meshes must be filtered out before the larger stones can be put into the basket. Therefore, the cost of the third conventional structure is also high.

Therefore, the invention provides a construction built from waste tires and its constructing method to mitigate or obviate the aforementioned problems.

SUMMARY OF THE INVENTION

The main objective of the present invention is to provide a construction built of waste tires which can be easily constructed with good strength and low cost.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1–4, a construction built from waste tires comprises multiple layers of waste tires (10) stacked together. A first layer is composed of multiple waste tires (10), each of which has a sidewall (11) cut off, connected in series by the sidewalls (11) respectively provided under the waste tires (10) and filled with ballast such as stones or earth. According to the present invention, the sidewalls (11) are respectively connected between two adjacent waste tires (10) by nails, metal wires, thick lines, screws, etc.

Figure 1:
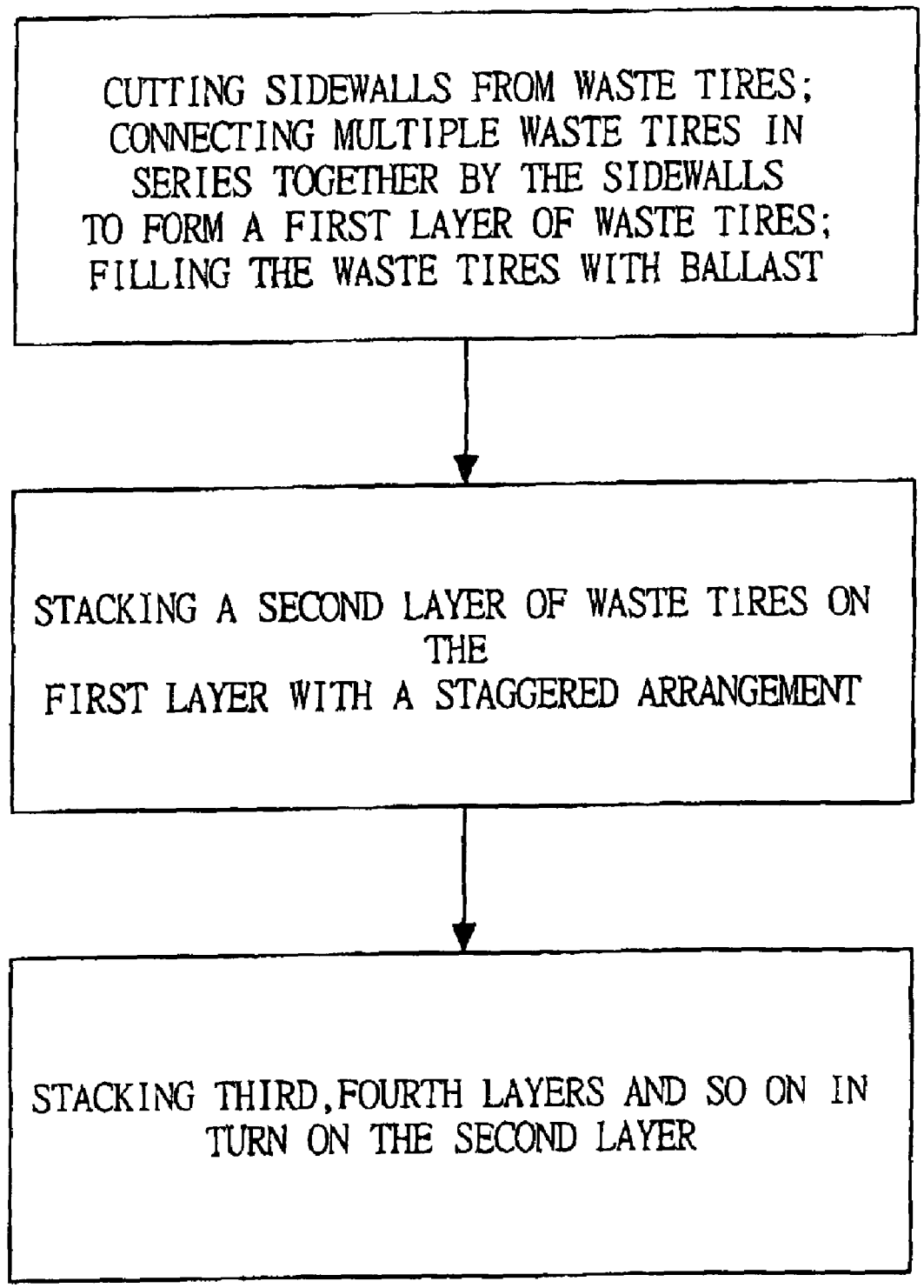
FIG. 1 is a flow chart of a constructing method in accordance with the present invention.
Figure 2:
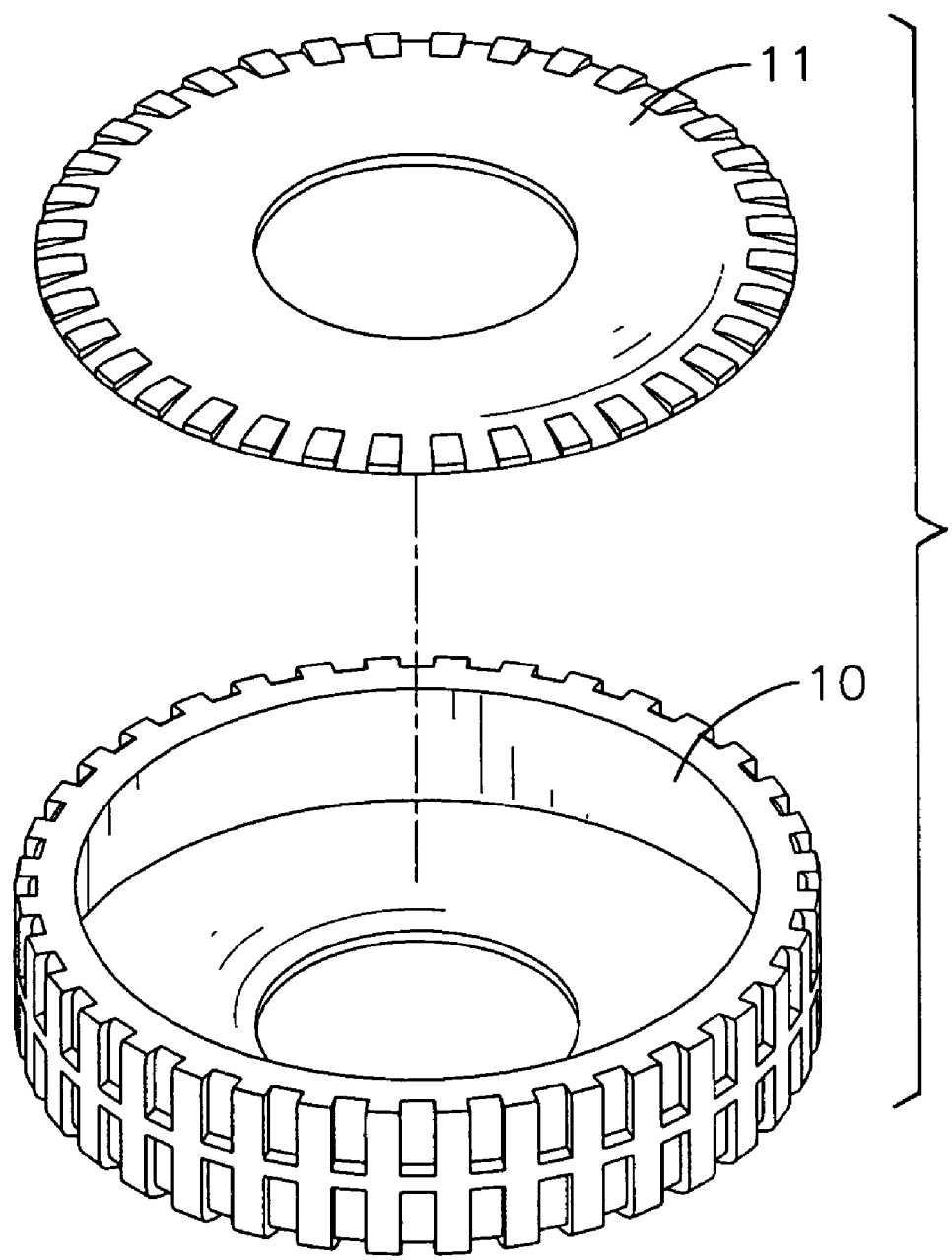
FIG. 2 is an exploded perspective view of a waste tire in accordance with the present invention.
Figure 3:
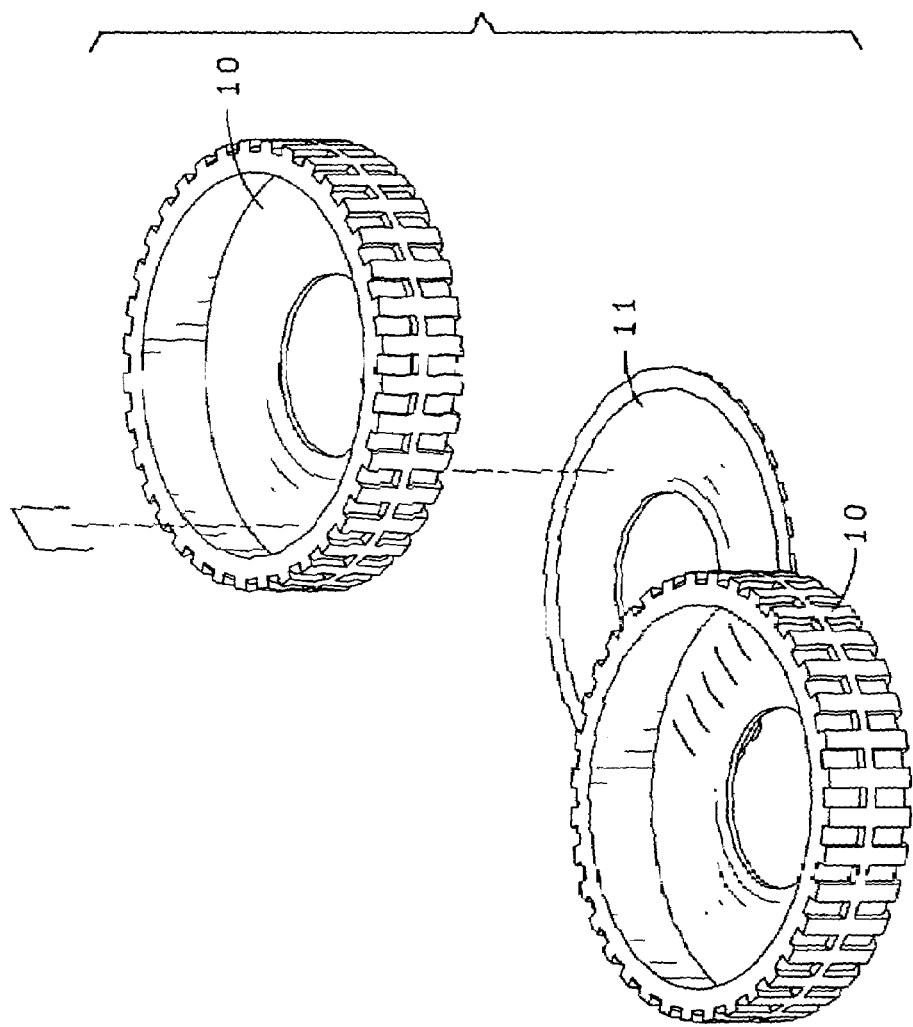
FIG. 3 is an exploded perspective view of two adjacent waste tires in accordance with the present invention.
Figure 4:
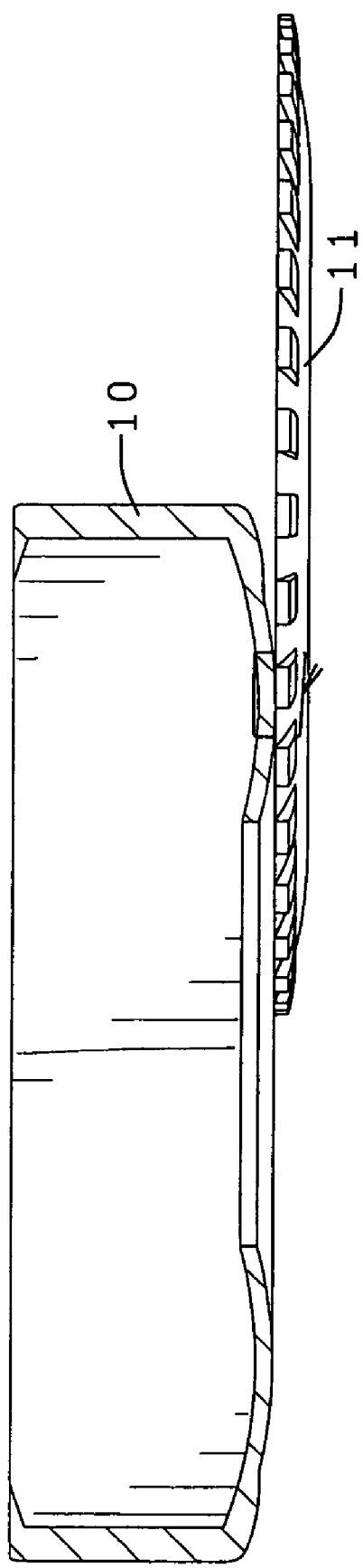
FIG. 4 is a cross sectional view of the waste tire and a sidewall combined together in accordance with the present invention.
Figure 5:
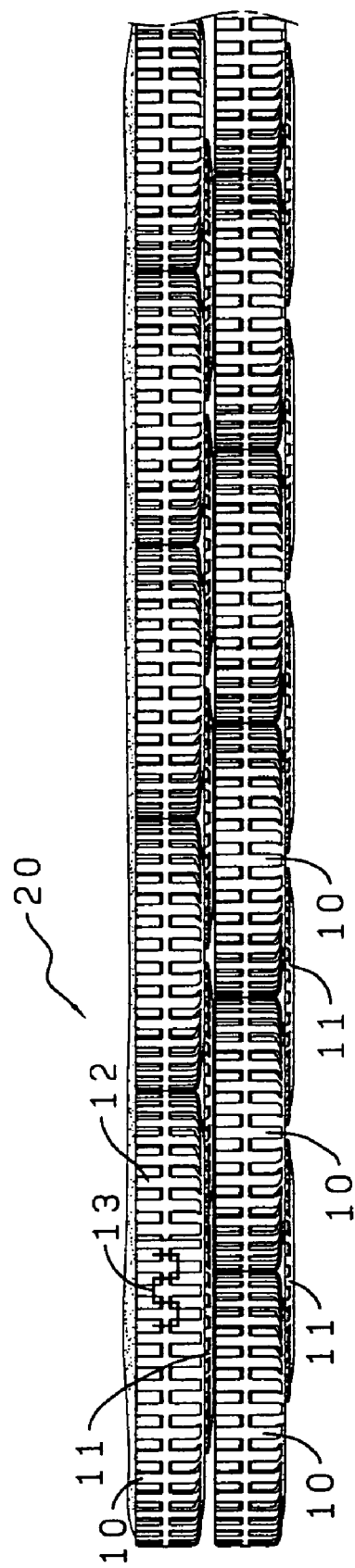
FIG. 5 is a front view of a construction built from the waste tires in accordance with the present invention.

A second layer is similar to the first layer and stacked on the first layer, as shown in FIG. 5. The second layer is also composed of multiple waste tires (10), each of which has the sidewall (11) cut off, connected in series by the sidewalls (11) respectively provided under the waste tires (10) and filled with stones or earth. Similarly, third and fourth layers and so on are in turn stacked on the second layer of waste tires (10).

Thus, a constructing method for the waste tire construction includes steps of cutting sidewalls (11) from waste tires (10), connecting multiple waste tires 10) in series together to form a first tire layer by the sidewalls (11) secured under the waste tires (10), and filling the waste tires (10) with stones.

Then, a second tire layer is stacked on the first layer, and also is composed of multiple waste tires (10) in series together by the sidewalls (11) secured under the waste tires (10), and filled with stones.

Thereafter, third, fourth layers and so on are in turn stacked on the second layer. Therefore, the waste tires to construct the construction are used as bricks to build a wall.

Figure 6:
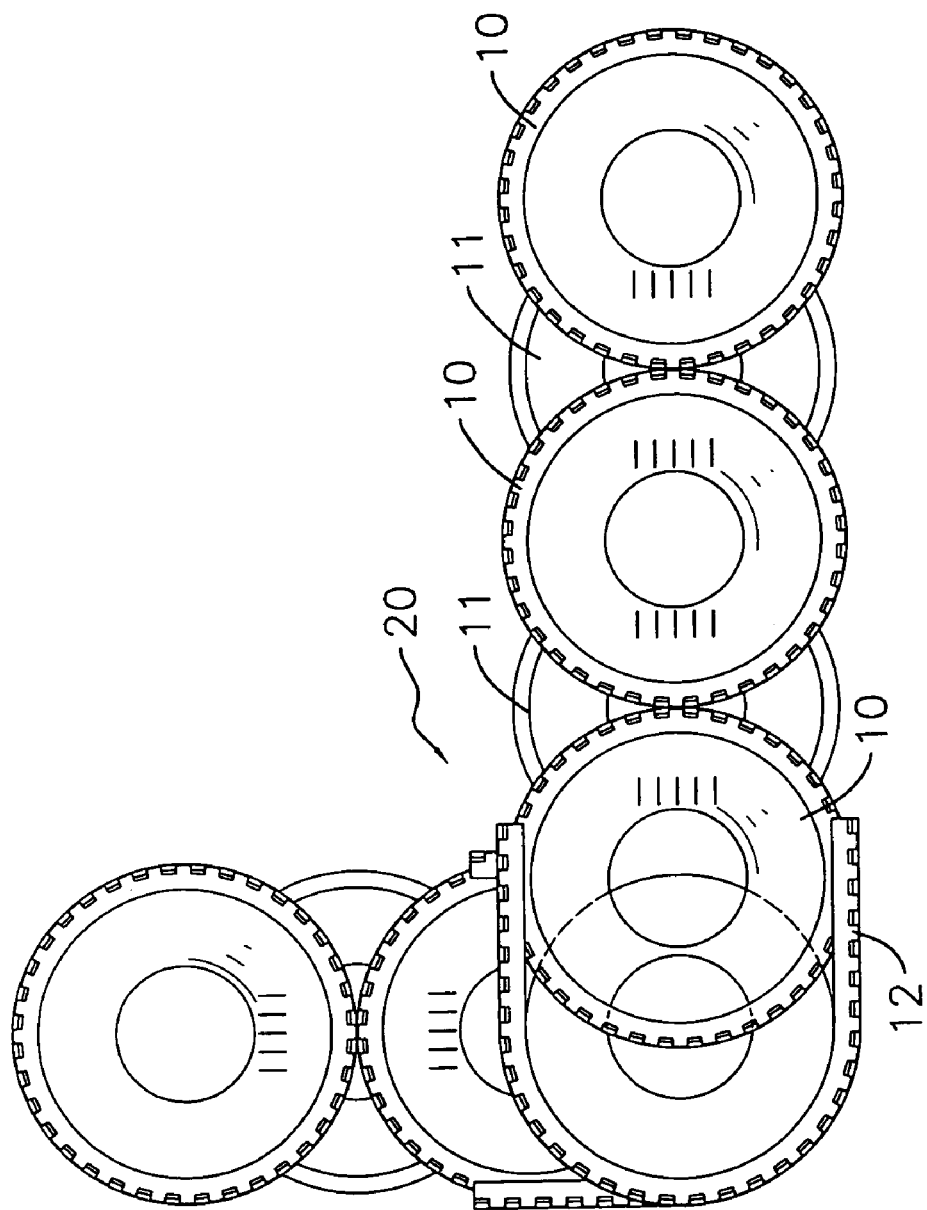
FIG. 6 is a top view of the construction built from the waste tires in accordance with the present invention.
Figure 7:
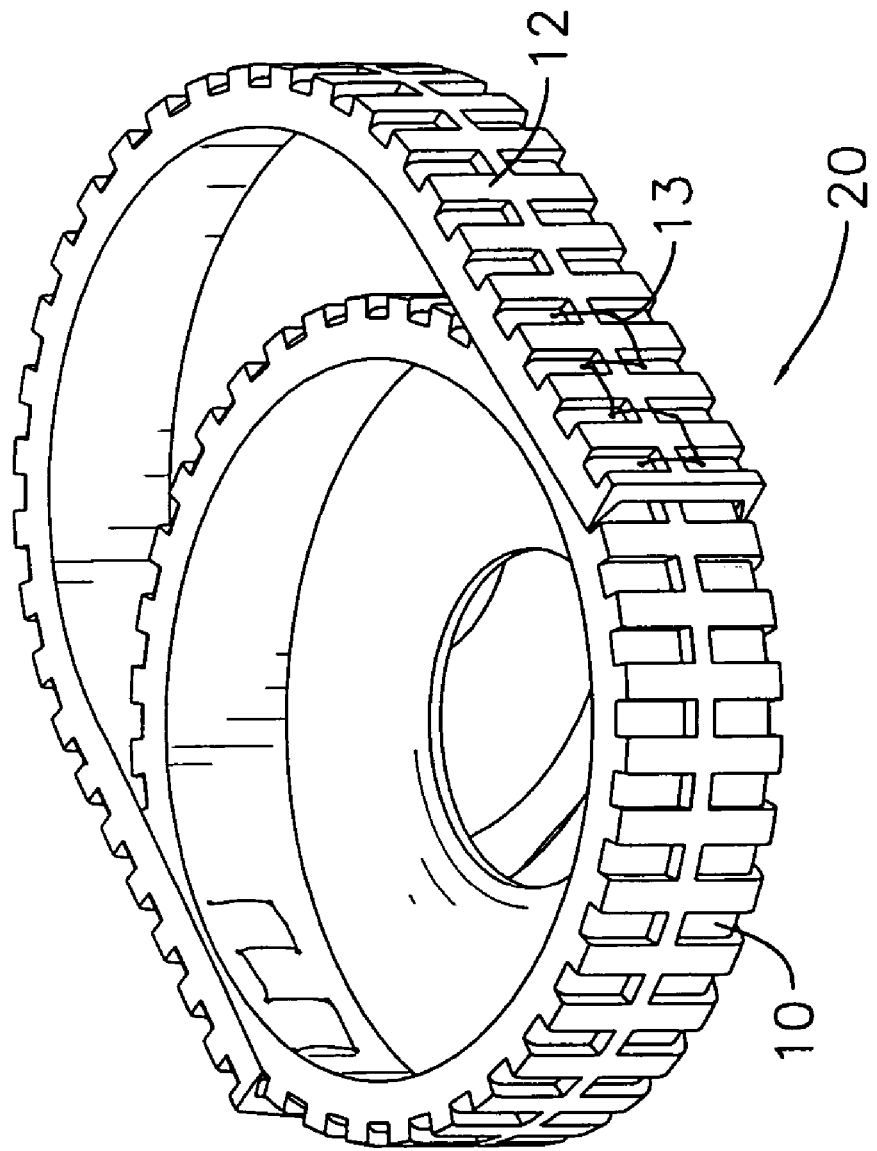
FIG. 7 is a perspective view of an end member in accordance with the present invention.

With reference to FIGS. 6 and 7, because the waste tires (10) are staggered in the different layers, a blank will appear at a corner or an end portion of the layers. Thus, an end member (20) is provided at the end or corner portion of the layers. The end member (20) includes a tire (12) cut into a C-like configuration with two ends connected to an outer periphery of a still circular tire (10). The length of the end member (20) is substantially equal to one and a half diameters of the tire (10). The C-like tire (12) is connected to the circular tire by thick lines (13), metal wires, screws, etc.

Figure 8:
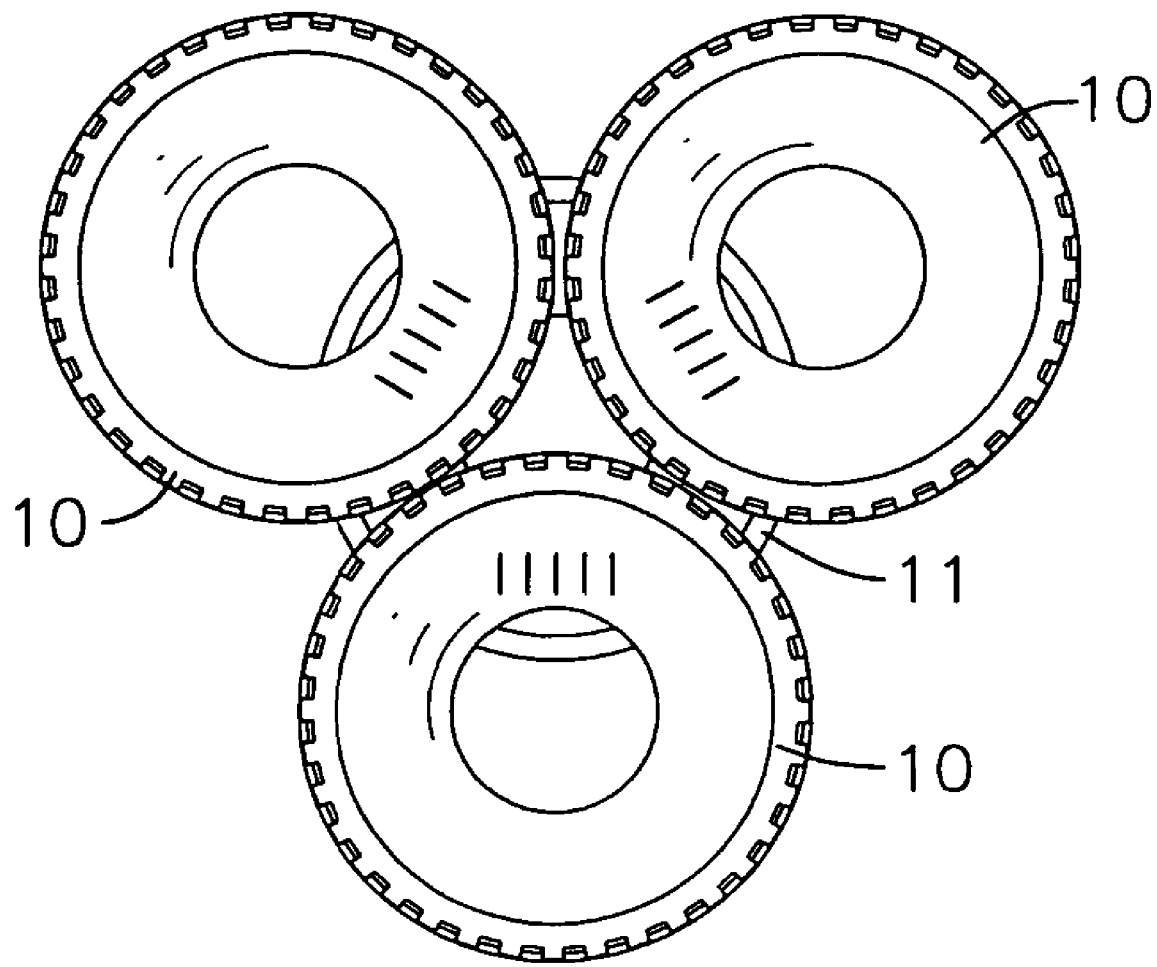
FIG. 8 is a top view of three waste tires combined on a tire sidewall in accordance with the present invention.

With reference to FIG. 8, the waste tires (10) can be connected together with different manners. In this embodiment, three waste tires (10) are connected on a sidewall (11) to form a construction unit. In another embodiment, four waste tires (10) can be connected on a sidewall to form a construction unit.

The advantages of the present invention are as follows:

1. It is easy to get the sidewall (11) of the waste tire (10) by cutting it from the waste tire (10), and both the stones and the earth are conveniently found in a working site.

2. Multiple layers of the waste tires (10) superposed with each other have a reinforced structure strength.

3. By recycling the waste tires (10), the construction cost of the present invention is low.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A construction method comprising:

providing at least first and second waste tires, with each waste tire including an upper sidewall, a lower sidewall, and a tread portion interconnecting and extending between the upper and lower sidewalls;

cutting the upper sidewalls from the tread portions of the first and second waste tires;

stacking the first and second waste tires on one of the cut upper sidewalls into a stack with the lower sidewalls of the first and second tires each abutting with the one of the cut upper sidewalls;

connecting multiple waste tires in series together by connecting the lower sidewalls of both of the first and second waste tires to the one of the cut upper sidewalls in the stack to form a layer of waste tires;

filling the layer of waste tires with ballast; and stacking another layer of waste tires on the previous layer with a staggered arrangement.

2. The construction method as claimed in claim 1, wherein providing waste tires includes providing a third waste tire, with the construction method further comprising:

cutting the upper and lower sidewalls from the tread portion and cutting the tread portion to form an end member having a C-like configuration with first and second free ends; and connecting the first and second free ends to diametric opposite positions of the tread portion of the first waste tire provided at an end portion of the layer of waste tires, with the end member compensating for the staggered arrangement between the layer of waste tires and the other layer of waste tires.

3. The construction method as claimed in claim 1, wherein the ballast is stone.

4. The construction method as claimed in claim 1, wherein the ballast is earth.

5. A construction built from waste tires comprising: at least first and second layers of waste tires stacked together, wherein each layer has at least first and second waste tires including a lower sidewall interconnected to a tread portion, and an upper sidewall cut from the tread portion, with the lower sidewalls of the first and second waste tires abutting with and connected to the upper sidewall in each of the first and second layers, with the upper sidewall of the second layer abutting with the tread portions of both of the first and second waste tires of the first layer, with each of the layers filled with ballast.

6. The construction built from waste tires as claimed in claim 5, wherein at least one of the first and second layers includes an end member comprising a tread portion with upper and lower sidewalls cut therefrom and cut into a C-like configuration with first and second ends, with the first and second ends connected to diametric opposite positions of the of the tread portion of the first waste tire provided at an end portion of the at least one of the first and second layers.

7. The construction built from waste tires as claimed in claim 5, wherein the at least first and second waste tires includes a third tire, with the the lower sidewall of the third tire abutting with and connected and fastened to the upper sidewall.

8. The construction built from waste tires as claimed in claim 5, wherein the upper sidewall is connected to the lower sidewalls by nails.

9. The construction built from waste tires as claimed in claim 5, wherein the upper sidewall is connected to the lower sidewalls by metal wires.

10. The construction built from waste tires as claimed in claim 5, wherein the upper sidewall is connected to the lower sidewalls by lines.

11. The construction built from waste tires as claimed in claim 5, wherein the upper sidewall is connected to the lower sidewalls by screws.

12. The construction built from waste tires as claimed in claim 5, wherein the ballast is stone.

13. The construction built from waste tires as claimed in claim 5, wherein the ballast is earth.

* * * * *